Nov. 7, 1961  E. N. IRWIN  3,007,331
DEVICE FOR RESTRAINING PRISONERS IN A
COMPARTMENT OF AN AUTOMOBILE
Filed May 25, 1959
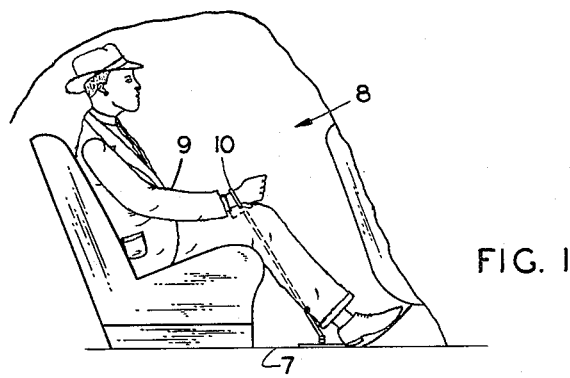
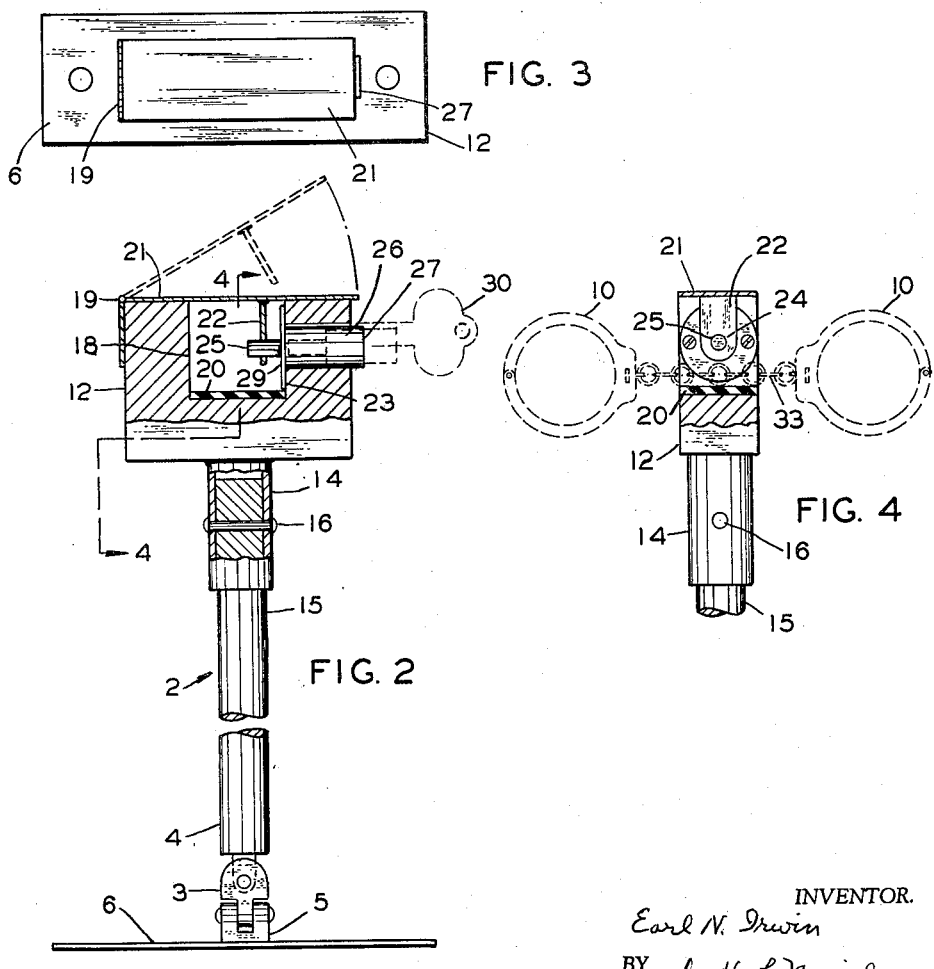
INVENTOR.
Earl N. Irwin
BY Scott L. Norvel
Atty.

United States Patent Office 3,007,331
Patented Nov. 7, 1961

3,007,331
DEVICE FOR RESTRAINING PRISONERS IN A COMPARTMENT OF AN AUTOMOBILE
Earl N. Irwin, 1625 E. Cambridge, Phoenix, Ariz.
Filed May 25, 1959, Ser. No. 815,359
1 Claim. (Cl. 70—57)

This invention pertains to restraining devices for prisoners

One of the objects of the device is to provide a standard secured to the floor of the rear seat compartment of an automobile which has adequate vertical movement to enable a prisoner to be handcuffed to it and still sit comfortably in the rear seat of the automobile.

Another object is to provide a restraining device consisting of a standard secured to the floor of an automobile adjacent to a seat therein and having a double universal joint to enable the standard to be tilted in any direction within limits and also having a lock block at the upper end of the standard which will receive links connecting the wrist cuffs of a handcuff and securely attach them to the standard by a simple easily operated clamp; said clamp bein locked in place automatically upon closing and designed to be opened only by a key applied to the outside end of the block.

Still another object is to provide a lock block to be attached to the upper end of a standard attached to the floor of an automobile having a body with a transverse notch midway between its ends and with an automatically closing snap lock operating a pin adapted to extend inwardly into the notch when it is in locked position and to be withdrawn from the inward position when it is unlocked; said block being cooperative with a locking plate hinged to one top end of the block and adapted to swing down over the transverse notch; said plate having an inwardly extending tongue adapted to extend into the notch adjacent one side thereof and having a hole adapted to receive the lock pin when the lock is in engaging position.

Another objects is to provide a standard, as above described, secured to the floor of the rear compartment of an automobile and having a locking block at its upper end adapted to receive and secure the link chains of a pair of handcuffs when a locking plate is swung to a locked position whereby a prisoner may be secured without changing his handcuffs and with a simple locking motion of the locking plate.

Other objects will appear hereinafter.

I attain the foregoing objects by means of the devices, parts and combinations of parts shown in the accompanying drawing wherein—

FIGURE 1 is a side elevational view of my prisoner restraining device as applied to the rear compartment of an automobile;

FIGURE 2 is a side elevational view of the standard and locking block; said standard and block being of the type shown in FIGURE 1 and drawn on an enlarged scale;

FIGURE 3 is a top view of the device as shown in FIGURE 2; and

FIGURE 4 is a rear view of the device as shown in FIGURE 2 with portions of the locking block sectioned off on line 4—4 of FIGURE 2 to show interior construction.

Similar numerals refer to similar parts in the several views.

The standard 2 has a double universal joint 3 at its lower end 4, and the lower part 5 of the universal joint is secured to a plate 6 which is secured to the floor 7 of the automobile compartment 8. The plate 6 is positioned so that the standard 2 may extend between the legs of the prisoner 9 and reach upward a sufficient distance so that handcuffs 10 worn by the prisoner, will extend through the locking block 12 at a height which will allow the prisoner to sit comfortably.

The locking block is secured by a tube 14 to the upper end 15 of the standard and is held in place by rivets such as 16.

The locking block 12 is rectangular in shape and is provided with a transverse notch 18. The notch is located centrally with the length of the block and the bottom is provided with a resilient pad 20.

A locking plate 21 is hinged to the block by a multiple section hinge 19 and when in closed position, as shown by solid lines FIGURE 2, lies flat on the top of the block, and closes the top of notch 18. A tongue 22 which extends from the underside of plate 21 extends into the notch opening at a position substantially adjacent the forward wall 23 of the notch which is the wall farthest removed from the hinged end of said locking plate. This tongue is provided with a circular opening 24 to receive a lock plunger 25. The lock plunger is contained within the cylinder 26 of the lock 27. The lock mechanism is constructed so that when it is released spring pressure forces the plunger 25 outward to the locking position shown in FIGURE 2. When the lock is in unlocked position the plunger 25 may be withdrawn into the body of the cylinder until it is substantially in a plane with the inside face of the inner end plate 29 of the cylinder. This motion is accomplished by inserting a key 30 and turning it. A spring within the cylinder forces the plunger outward to the position indicated by the dotted outlines of these parts.

When the plunger is extended inward to locking position, which is done by pressing on the outer end of the cylinder, the plunger 25 engages a detent and is held inwardly and extends through the hole 24 in the tongue 22 thereby locking plate 21 down.

The handcuffs 10, as shown in FIGURE 4, may be positioned with the cuffs on each side of block 12 and with the chain which holds them together lying at the bottom of notch 18. This may be done by officers, when the handcuffs are applied to a prisoner who is to be restrained by the simple motion of pushing the lock plunger inward. It is not necessary to release the handcuffs. When the chain portion 33 of the handcuffs is placed in notch 18 it is secured by hinging plate 2 downward until tongue 22 is in a position to be locked. As soon as the plate is in position the lock plunger is snapped inward by pressing the cylinder 26 to extended position of plunger 25. The details of the inside of the lock are well known to the art and not considered part of this invention. It should be understood that the lock, per se, is merely one of the elements used to make the device workable to restrain prisoners wearing handcuffs.

With the prisoner seated in the compartment of an automobile, as shown in FIGURE 1, and with the handcuffs 10 locked by means of the plate 21 on block 12, the prisoner is securely restrained from any damaging motion he might try to make. On the other hand, he is free to move within the limits of the tilt of standard 2 and to shift his position to remain comfortable.

It is also to be observed that by providing the lower end of the standard 2 with the universal joint 3 the possibility of the prisoner breaking the standard loose from the floor of the automobile compartment is minimized. If the standard were bolted solidly to the floor then it might be possible for the prisoner to pry it loose by exerting pressure which would tend to tilt it and he would have the aid of the leverage provided by the length of the standard. With the universal joint 3 at the lower end of the standard, any tilting effort the prisoner might make merely causes the standard to yield in the direction in which it is pushed or pulled. Prisoner can gain no purchase or leverage on the standard.

I claim:

A device for restraining a prisoner in a seat of a compartment in an automobile wherein said compartment has a floor, said device comprising a rigid elongated non-extensible standard, a plate adapted to be mounted substantially flush to the floor of said compartment adjacent the front of said seat, a universal joint connecting said plate to the lower end of said standard to permit the upper end of the standard to tilt, a block attached to the upper end of said standard, said block having a transverse notch to receive a chain linking a pair of handcuffs together, a locking plate hinged on said block and adapted to swing over the top of said block and close said transverse notch, a tongue extending from the underside of said locking plate, said tongue being provided with an aperture to receive a lock plunger, a key-operated cylinder lock mounted in said block having a lock plunger extendable into said aperture, for locking said plate over the top of said block.

References Cited in the file of this patent

UNITED STATES PATENTS

| | | |
|---|---|---|
| 656,672 | Sprenger | Aug. 28, 1900 |
| 2,645,922 | Martin | July 21, 1953 |
| 2,949,761 | Mitchell et al. | Aug. 23, 1960 |